Oct. 18, 1966  J. KLINE  3,279,464
MYOCARDIAL PROSTHETIC DEVICE
Filed Dec. 30, 1963  3 Sheets-Sheet 1
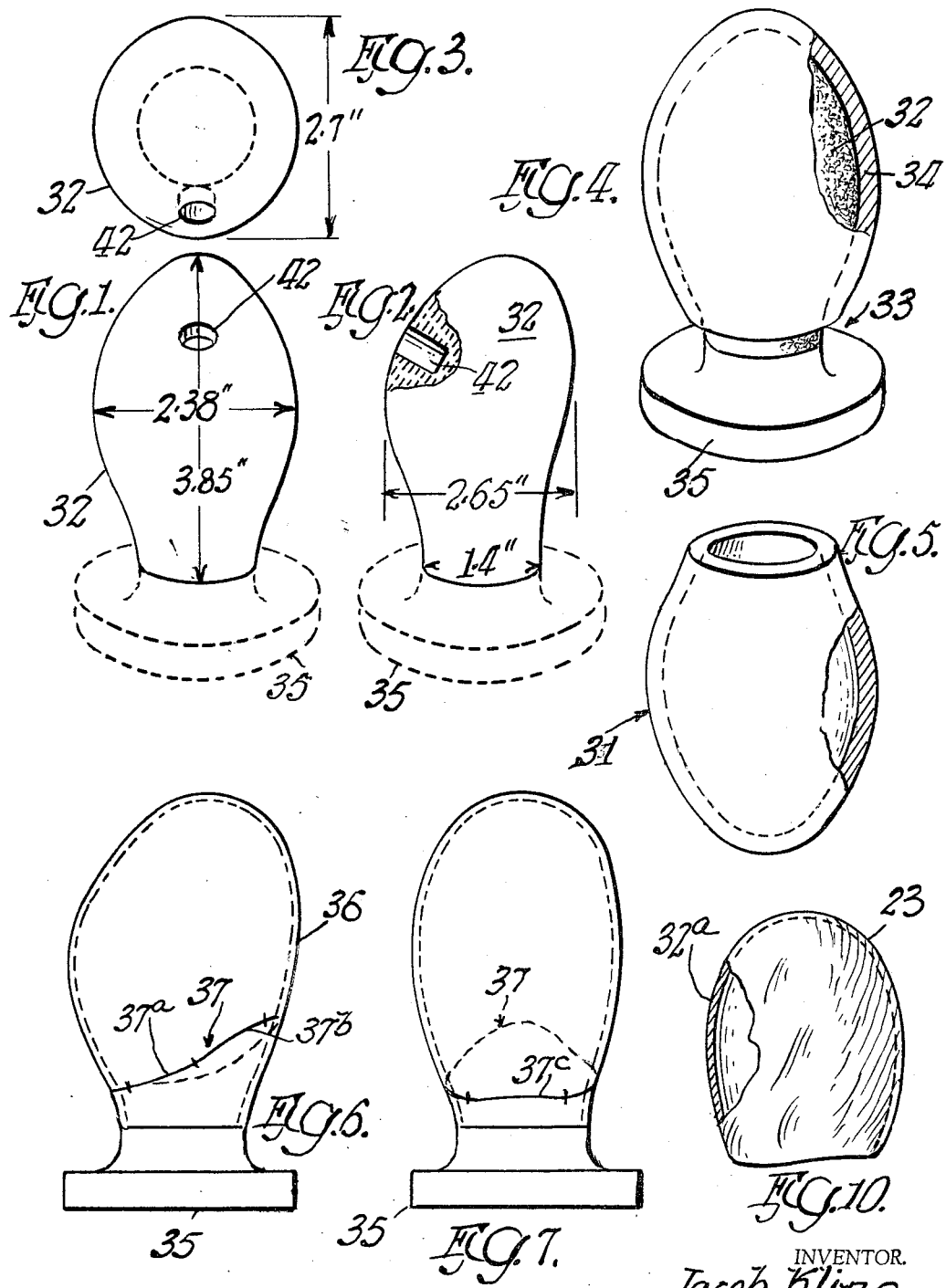
INVENTOR.
Jacob Kline

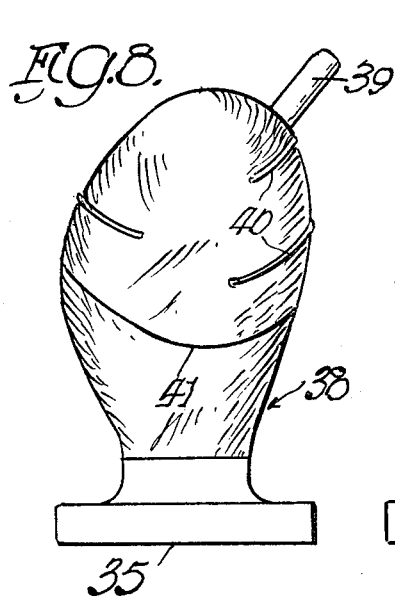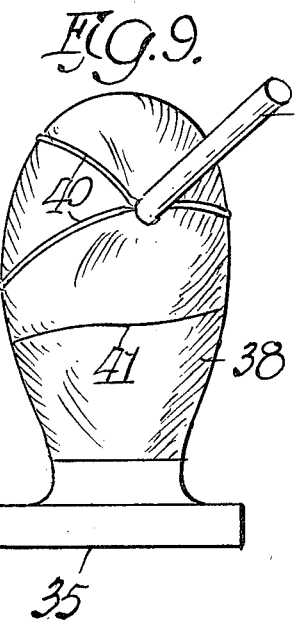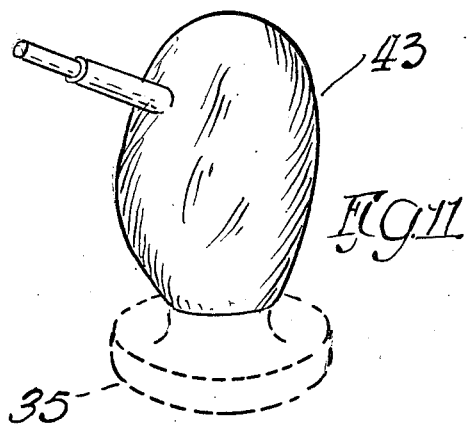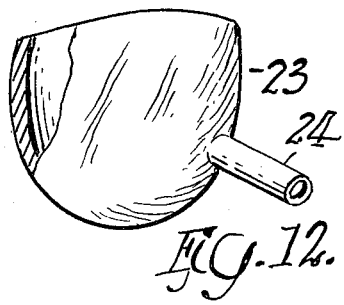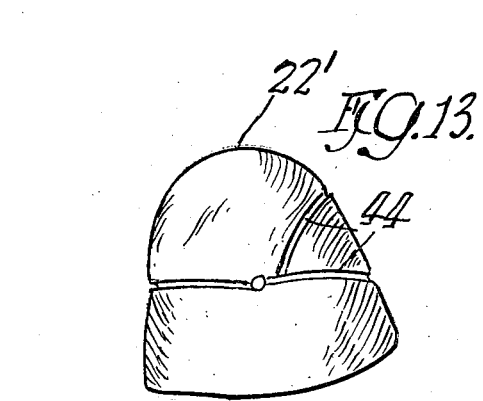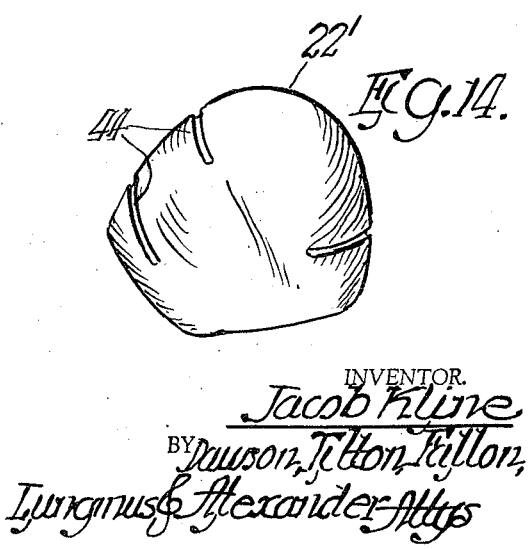

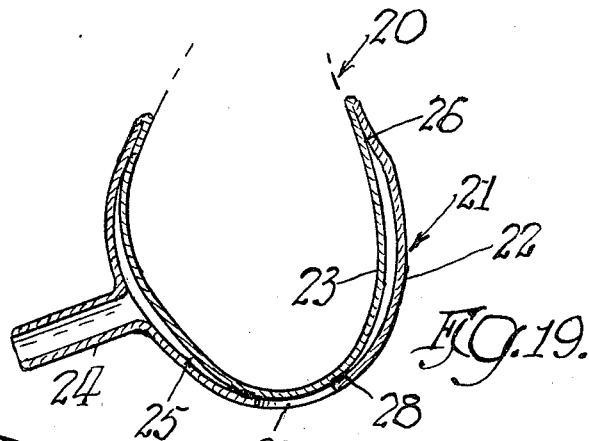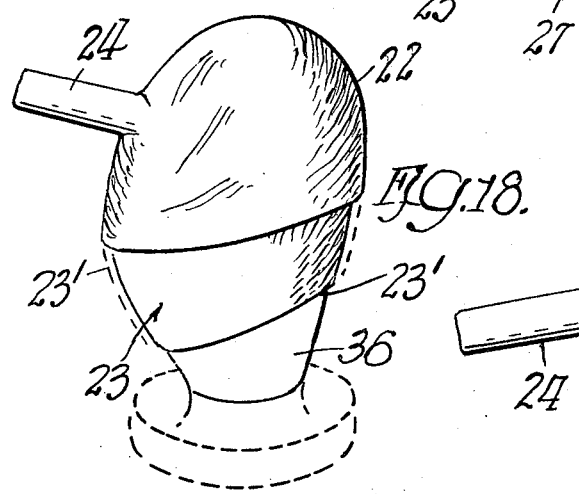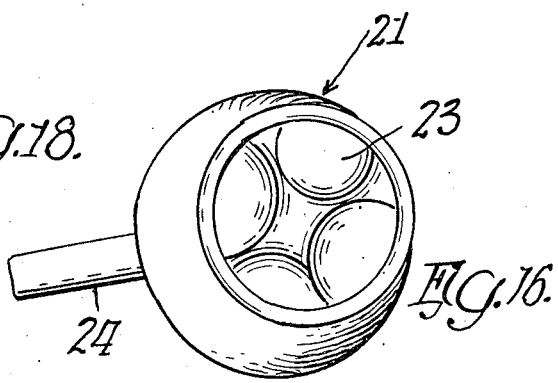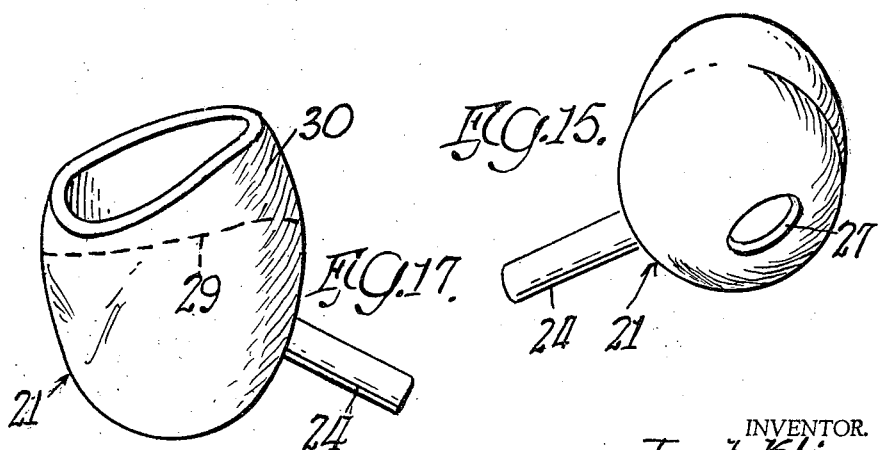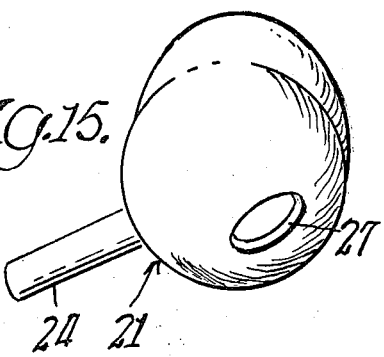

United States Patent Office 3,279,464
Patented Oct. 18, 1966

3,279,464
MYOCARDIAL PROSTHETIC DEVICE
Jacob Kline, Peace Dale, R.I., assignor to Iowa State University Research Foundation, Inc., Ames, Iowa, a corporation of Iowa
Filed Dec. 30, 1963, Ser. No. 334,451
2 Claims. (Cl. 128—64)

This invention relates to a myocardial prosthetic device and method, and, more particularly, to a device suitable for installation in partial enveloping relation with a mammalian heart and the method of producing the same.

The invention finds utility in effecting ventricular contraction artificially in mammalian hearts. Thus, the prosthesis is not an artificial heart, as such, but an adjunct thereto. However, it must be characterized by reliability, and further simplicity of construction and ease of installation. The provision of a device having these characteristics therefore constitutes an important objective of the invention.

Other objectives relative to the above-described device include the determination of the size and shape of the device, suitable materials for its fabrication, means of fitting and attaching it to the heart, and the physical interaction of the device with adjacent tissues, nerves, vessels and organs. Among other objectives, it is desired to permit insertion of the prosthesis through a thoracotomy insertion without requiring removal or reflection of a rib.

Other objects and advantages of the invention may be seen in the details of construction and manufacture set down in the following specification.

The invention is described in conjunction with an illustrative embodiment in the accompanying drawings, in which:

FIG. 1 is a front elevational view of a positive plaster model of a conventional mammalian heart, made by sculpturing;

FIG. 2 is a side elevational view of the model appearing in FIG. 1;

FIG. 3 is a top plan view of the model of FIGS. 1 and 2;

FIG. 4 is an elevational view of a positive plaster model having a wax coating applied thereto, for later stripping of the coating therefrom to provide a wax mold;

FIG. 5 is a perspective view, with parts broken away, of the wax mold, as produced in connection with FIG. 4, after the mold has been stripped or otherwise removed from the positive plaster model;

FIG. 6 is a right-hand side view of a mannequin produced through the use of the wax mold of FIG. 5 and upon which the inner shell of the prosthesis is made;

FIG. 7 is an elevational view of the ventral side of the mannequin appearing in FIG. 6;

FIG. 8 is a dorsal view of the mannequin for the outer shell of the prosthesis and as provided with a certain stem, wire and trimming line as will be hereinafter more fully mentioned;

FIG. 9 is a ventral view of the mannequin of FIG. 8;

FIG. 10 is a perspective view of the inner shell after its removal from the mannequin appearing in FIGS. 6 and 7 and after the trimming of the open end thereof;

FIG. 11 is an elevational view showing the first stage of the outer shell as formed on the mannequin of FIGS. 8 and 9;

FIG. 12 is an elevational view, partially broken away, of the outer shell after its removal from the mannequin of FIG. 11 and after it has been trimmed about the periphery of its open end to match the similar end of the inner shell appearing in FIG. 10;

FIG. 13 is an elevational inside-out ventral view of the outer shell, better to show the grooves on the interior of the shell which provide air passageways on the inner surface of the outer shell;

FIG. 14 is a view similar to FIG. 13 as viewed from the dorsal side;

FIG. 15 is a perspective view of the outer shell in one stage of the manufacture thereof, as viewed from the bottom end, better to show a certain opening in the bottom end and which will be more fully described later;

FIG. 16 is a perspective view of the prosthesis as viewed from above and showing portions of the inner liner inflated;

FIG. 17 is a perspective view of the device as viewed from the right-hand side thereof;

FIG. 18 is a perspective view illustrating a later step in the production of the device and with the outer shell in place on the inner shell which is mounted on its mannequin; and FIG. 19 is a vertical sectional view of the prosthesis when positioned upon a mammalian heart.

Referring first to FIG. 19, the numeral 20 designates generally the lower portion of a mammalian heart, such as a dog heart, and the numeral 21 designates generally the inventive prosthesis. The prosthesis 21 is seen to include an outer shell 22 and an inner shell 23. The shells 22 and 23 are slightly spaced apart under the influence of pressure fluid delivered through the stem 24 and into an annular space designated 25. The periodic ventricular contraction can thus be provided through sequentially pressurizing and evacuating the space 25 through suitable means coupled to the tubular stem 24.

The outer shell 22 is flexible, yet firm or sufficiently rigid to withstand the dynamic pressure of five pounds per square inch without appreciable stretching. An intentional moderate flexibility of the outer shell 22 is advantageous to provide some freedom of movement should heart distention and rotation occur. Also, less irritation to the mediactium, phrenic nerves, lungs and vessels leaving and entering the heart is likely to result when these structures come in contact with the prosthesis 21 when this device is made of a moderately flexible substance rather than a hard, completely rigid material. Thus, I provide a laminate of flexible and semi-rigid materials to provide the outer shell 22 relatively rigid when compared to the relatively flexible inner shell 23.

The inner shell or liner 23 is made up of layers of molded Dermoid and Guardex. Dermoid is a trademark for latex foam manufactured by Williams Gold Refining Co., Inc., Buffalo, N.Y. Guardex is a trade name for a latex compound manufactured by The Hygienic Dental Manufacturing Co., Akron, Ohio. The outer shell 22 is thicker and essentially non-elastic, yet moderately flexible and includes layers made of the same compositions.

The outer and inner shells 22 and 23, respectively, are bonded together during fabrication thereof in the area 26 which corresponds to the surface of the atria. At surfaces covering the ventricles, there is no connection between the inner and outer shells, except at the ventricular apex, as described later. The stem 24 is provided in this unbonded area and is molded as an integral part of the outer shell 22.

In order to minimize the problem of keeping the prosthesis in position on the heart during chronic use, the prosthesis is shaped to fit the contour of the heart, particularly on the sternocostal surface near the upper border, where a marked curvature is found. The cross-sectional area at the collar or open top of the device 21 is made smaller than the maximum diameter of the heart in order to help prevent the heart from slipping out of the prosthesis. Additional insurance against slippage from the heart is provided by the air stem 24 attached to a sternum-plate, or having it project through the sternum. The flexible feature of the prosthesis 21 makes it possible to squeeze the heart through the collar.

The opening at the bottom apex of the prosthesis 21, previously referred to, is designated 27 and, in the illustration given, is generally elliptical in shape, being ¾" along its major axis and ⅜" along its minor axis, with the apex of the prosthesis 21 being in the elliptical center, i.e., at the intersection of the major and minor axes. The area of union between the outer and inner shells 22 and 23 about the apex is designated 28 in FIG. 19, and the upper area of union occurs above the dotted line generally designated 29 in FIG. 17. The contour line 29 corresponds to the coronary sulcus along the boundary of the atria and the ventricles. Because the outer and inner shells are not separable above the contour line 29, no direct pressure is exerted over the atria during the operation of the prosthesis 21.

The position and location of the stem is arranged for chronic closed chest use to fit an adapter plate attached to the sternum, but for experimental short-term open chest operation, the stem 24 may be directly projected through a hole in the sternum made with a drill through the center of the fourth sternebrae.

The prosthesis 21 is operated by pumping controlled periodic pulses of air or other pressure fluid into the stem 24, alternately creating a vacuum condition. Through this, a periodic force is created between the thin flexible inner liner 23 and the thicker outer shell 22 over the surfaces where no bond exists. The inner liner 23 is seen to be distended in FIG. 16 through such a periodic pulse of pressure fluid, and in this condition causes a contraction of the ventricles. However, no direct pressure is developed on the atria due to the bond that exists between the outer and inner shells in this area as at 30 in FIG. 17.

The opening 27 facilitates bonding of the inner and outer liners as at 28 so that separation thereof is prevented in the neighborhood of the apex. This minimizes the upward force components on the lower portions of the diaphragmatic and sternocostal surfaces of the heart; also further reducing the tendency for the device to slip out from the heart.

The muscle fibers of the myocardium are arranged spirally. Upon ventricular contraction, the blood is wrung out of the cavity. As a result, the heat rotates slightly to the right, pressing the apex more firmly against the chest wall. The flexible nature of the stem, particularly where it is mounted on the outer shell 22 of the prosthesis 21, permits a slight turning of the encapsulated heart during artificially induced ventricular contraction.

*Fabrication of prosthesis*

The first step in fabricating the device 21 consists in developing a negative wax model, as shown in FIG. 5 and which is designated generally by the numeral 31. The wax model 31 is made by first studying the shape and size of the heart of several embalmed dogs, each weighing approximately 10 kilograms. From the results of the study, a positive plaster model 32 (see FIGS. 1–3) of the heart was sculptured. By successively dipping the plaster model 32 into a bath of molten wax, the arrangement generally designated 33 in FIG. 4 was achieved. In FIG. 4, a wax overlay (as by dipping) is designated 34, and this is seen to be in contact with the sculptured model 32, the model 32 being equipped with a base 35 for convenience of handling. Removal of the overlay 34 from the sculptured plaster model 32 resulted in the negative wax model of FIG. 5. In FIGS 1–3, the dimensions corresponding to the full sized sculptured plaster model have been applied, the showing in these views being about two-thirds size.

After the wax model 31 of FIG. 5 was removed from the plaster model 32, it was further shaped and tailored by hand with sculpturing tools and a frame to conform to the size and shape of the heart of anesthetized dogs weighing approximately 10 kilograms. Fittings on three anesthetized dogs were required before a tailored model was evolved.

Using the negative wax model 31 as a form, two plaster positive heart models were cast with plaster of Paris. These are shown in FIGS. 6 and 7 for the inner shell 23, and in FIGS. 8 and 9 for the outer shell 22.

The positive plaster model seen in FIGS. 6 and 7 and designated 36 was reduced from the "as cast" condition by having each dimension reduced about 1/32 of an inch through the use of sandpaper. In FIGS. 6 and 7, a contour line 37 is shown, which establishes the periphery not only of the inner liner 23, but of the completed prosthesis 21. The contour line 37 is made up of segments which correspond to the contours around the heart serving as a limit beyond which a foreign object around the heart may occlude some of the vessels entering and leaving the heart.

The contour line 37 is marked on the mannequin with an indelible pencil, and, as a result, the moisture in the material used in forming the inner liner 23 reacts with the pencilled line and causes a compression of this line to be formed on the inner surface of the inner liner 23. Thus, when the completed device is removed from the mannequin after fabrication, the periphery of the device is outlined and a guide line for trimming is provided. For example, the section of the contour line designated 37a corresponds to the periphery of the prosthesis along the right pulmonary junction at the right border of the heart, while that designated 37b corresponds to the periphery of the prosthesis along the posterior vena cava at the lower border of the heart. The portion designated 37c in FIG. 7 occurs along the upper border of the heart.

Ordinarily, the inner liner 23 is not removed as such from the model 36 of FIGS. 6 and 7, but only after the outer liner 22 has been attached to the inner liner 23. The inner liner 23, after fabrication on the model 36, has the appearance seen in FIG. 10.

FIGS. 8 and 9 show two views of the larger casting of plaster of Paris designated 38 and which is used to develop the outer shell 22. Seen mounted in the casting 38 is a polystyrene rod 39 which serves as a form for the fabrication of the stem 24. Mounted on the surface of the model 38 are copper wires 40 to provide a series of grooves on the interior surface of the outer shell 22. The ultimate contour of the outer shell 22 is defined by a line 41 which again is inscribed with an indelible pencil and which corresponds to the edge of that part of the outer shell which is separable from the inner shell. This contour 41 is the same as the contour 37 shown in FIGS. 6 and 7 and, as previously indicated, outlines the right and left ventricles of the heart where they meet the atria along the coronary sulcus.

For the purpose of mounting the polystyrene rod 39, a hole 3/16" in diameter and ½" deep is drilled in the ventral surface as at 42 in FIG. 1, and which serves as a support for the 3/16" diameter rod 39.

The wires 40 provide channels on the inside of the outer shell 22 for air passageways to permit complete escape of pressure fluid from the space 25 between the inner liner 23 and outer shell 22 during the vacuum portion of the operational cycle. For this purpose, sections of No. 14 American wire gauge (A.W.G.) wire are fitted around the model 39 as it is seen in FIGS. 8 and 9. The pieces of wire are held together by a hole drilled with a No. 42 drill at the location for one end of the wire, a shallow groove formed with a knife along the path for the wire, and a depression cut with a knife in the side of the opening for the polystyrene stem for placement of the other end of the piece. The development of the outer shell is started on the mannequin seen in FIGS. 8 and 9, while the inner liner 23 is developed on the smaller mannequin shown in FIGS. 6 and 7, which procedure is outlined below.

*Fabrication of inner liner*

(1) With a small brush, a thin layer of Dermoid is painted on the mannequin 36 beyond the contour 37.

(2) The layer thus provided is vulcanized for more than 15 minutes at room temperature.

(3) A second thin layer of Dermoid is applied.

(4) The second layer is vulcanized at room temperature for at least 15 minutes.

(5) A thin layer of Guardex is sprayed on the second layer of Dermoid with a spatula.

(6) The Guardex is vulcanized by placing the unit in an oven having a temperature of 150° F. for at least one hour.

(7) A final thin coat of Dermoid is applied and allowed to vulcanize, the total thickness of the layers being of the order of 1/32", this being designated 32a in FIG. 10.

The outer shell is fabricated in a similar manner to the inner liner, use being made of the cast or model 38 seen in FIGS. 8 and 9 in the following procedure:

*Fabrication of outer shell*

(1) A thin layer of Dermoid is painted on the model 38 extending beyond the contour line 41 and also in covering relation with the dowel or rod 39.

(2) This coating is vulcanized for at least 15 minutes at room temperature.

(3) A second coating of Dermoid is painted on the form and allowed to vulcanize.

(4) A thin layer of Guardex with flock is spread on the second coat of dermoid, using a spatula. The flock thickens the consistency of the Guardex and also provides for the inelastic yet moderately flexible characteristic of the outer shell. The flock employed is pulverized pieces of nylon which is furnished separately with Guardex by the manufacturer of Guardex. 3 cubic centimeters of flock are mixed with 20 cubic centimeters of Guardex.

(5) The layer of Guardex is vulcanized in an oven for approximately 2 hours at 150° F.

(6) A slightly heavier layer of Guardex with flock is applied to the vulcanized first Guardex layer.

(7) The second Guardex-flock layer is vulcanized at 150° F. for approximately 2½ hours.

(8) A medium layer of Guardex without flock is applied to the slightly heavier second layer of Guardex.

(9) The medium layer of Guardex without flock is vulcanized at 150° F. for approximately 2 hours.

(10) A medium layer of Guardex without flock is applied.

(11) The above-mentioned medium layer of Guardex is vulcanized for one hour at 150° F.

FIG. 11 illustrates the completed outer shell as at 43, and this shell is removed from the mannequin, trimmed around the line 41 imprinted by the indelible ink of the casting. Two views of the trimmed shell designated 22' are seen in FIGS. 13 and 14, wherein the shell is turned inside-out to show the groove 44 provided by the wires 40 and which insure air passage during the vacuum period.

At this stage, the opening 27 is cut into the apex of the outer shell 22 and the shell 22 is now placed over the inner liner 23 (see FIG. 18) which is still in place on the smaller plaster cast 36. The following procedure is employed to complete the prosthesis.

*Union of inner and outer shells*

(1) A thin coat of Dermoid is applied over the entire assembly.

(2) The coating of step 1 is vulcanized for at least 15 minutes at room temperature.

(3) A second thin coat of Dermex is applied over the entire assembly and allowed to vulcanize for 15 minutes.

(4) A thin layer of Guardex without flock is applied by spatula to the section of the inner liner which extends beyond the outer shell as at 23' in FIG. 18. The thin layer of Guardex is also applied to the section of the inner liner which is exposed by the opening 27.

(5) The thin layer of Guardex is vulcanized in an oven at 150° F. for at least one hour.

(6) To the same section as in step 4, a medium layer of Guardex without flock is applied.

(7) The Guardex of step 6 is vulcanized in an oven at 130° F. for at least 1½ hours.

(8) To the same sections as in steps 4 and 6 immediately above, a thick layer of Guardex with flock is applied, but this layer is not extended beyond the boundary 23" of FIG. 18.

(9) This is vulcanized in an oven at 160° F. for at least 2 hours.

(10) A final layer of Guardex with flock is applied to the same sections as in steps 4, 6 and 8 and sufficiently thick to make the thickness of the assembly uniform with the outer shell.

(11) This additional layer, which is designated 23" in FIG. 18, is then vulcanized in an oven at 150° F.

(12) The entire assembly including the stem 24 is covered with a layer of Dermoid and allowed to vulcanize at room temperature.

(13) A second layer of Dermoid is applied to the entire assembly and allowed to vulcanize.

(14) A medium layer of Guardex with flock is applied.

(15) The layer applied in step 14 is vulcanized in an oven at 150° F. for at least 2 hours.

(16) A thick layer of Guardex with flock is applied and vulcanized in an oven at 150° F.

(17) A layer of Guardex is applied carefully to make the cover smooth and even, after which vulcanization in an oven at 150° F. is performed.

(18) Two successive layers of Dermex are applied with vulcanization allowed to occur between the application of the layers.

(19). The assembly was removed from the cast 36 and trimmed along the line imprinted by the indelible ink.

The above outlined procedure may be used for development of other occluding devices such as are used in connection with veins and arteries, as would be advantageously used in surgical procedures.

Further, other suitable materials of construction include silicone, Silastic materials, Ivalon and polyurethane.

While in the foregoing specification a detailed description of an embodiment of the invention has been set down for the purpose of illustration thereof, many variations in the details herein given may be made by those skilled in the art without departing from the spirit and scope of the invention.

I claim:

1. A myocardial prosthetic device, comprising a unitary body adapted to be mounted in a mammalian thoracic cavity about the heart, including cup-shaped inner and outer shells arranged in generally nested relation to provide an open top and a closed bottom apex, said outer shell being relatively rigid so as to withstand a pressure of the order of about 5 p.s.i. without substantial stretching while being capable of flexing limitedly to accommodate heart distention and rotation, said inner shell being relatively flexible and being peripherally united to the outer shell adjacent said open top to provide an annular space between the lower portions of said shells, the cup-shape being sized to envelop the heart ventricles but to only partially overlay the heart atria, the shells also being united in the portion overlying the said bottom apex, and a stem mounted on the outer shell between the united areas and providing a conduit communicating with said annular space, said stem having a flexible portion at the point of stem mounting on said outer shell to permit heart rotation during ventricular contraction, said outer shell on the inside surface thereof being equipped with a plurality of grooves communicating with said stem for flow of pressure fluid during periodic evacuation of said annular space.

2. The structure of claim 1 in which said outer shell is provided with an opening at said bottom apex.

References Cited by the Examiner

UNITED STATES PATENTS 3,034,501  5/1962  Hewson _____ 128—39
3,233,607  2/1966  Bolie _____ 128—64

RICHARD A. GAUDET, Primary Examiner.

L. W. TRAPP, Assistant Examiner.